May 4, 1954   K. A. BERGENDAHL   2,677,265
COMBINATION TYPE CONTROL MECHANISM FOR LOCK BOLTS
Filed June 23, 1950   7 Sheets-Sheet 1

Inventor:
Kavalli Alverius Bergendahl
By: Pierce, Scheffler & Parker,
Attorneys.

May 4, 1954  K. A. BERGENDAHL  2,677,265
COMBINATION TYPE CONTROL MECHANISM FOR LOCK BOLTS
Filed June 23, 1950  7 Sheets-Sheet 3
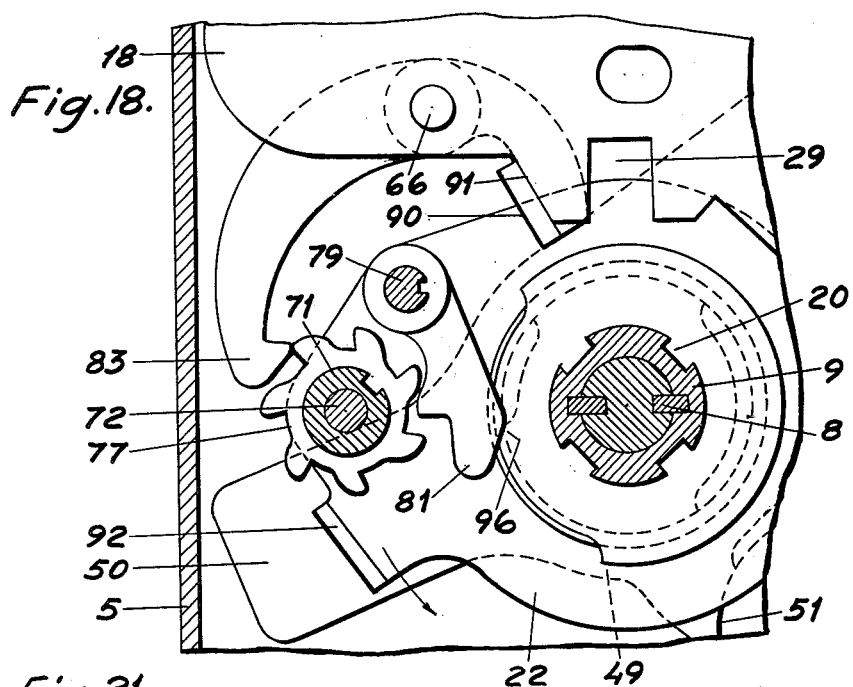
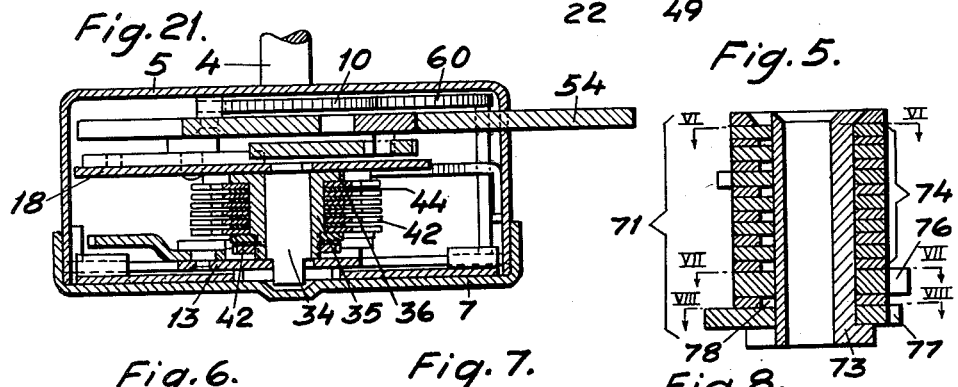
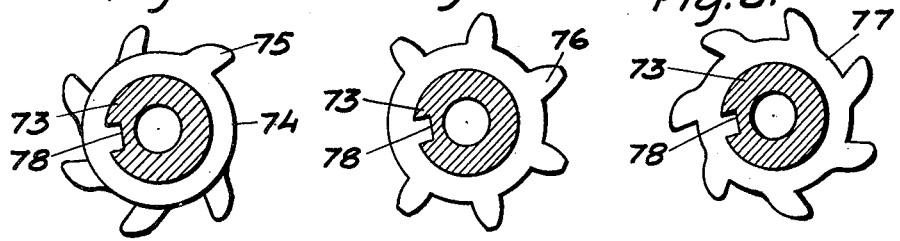
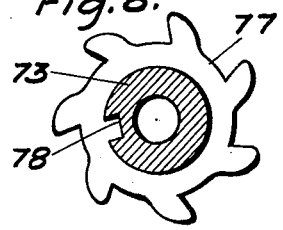
Inventor:
Kavalli Aloerius Bergendahl,
By Pierce, Scheffler & Parker,
Attorneys.

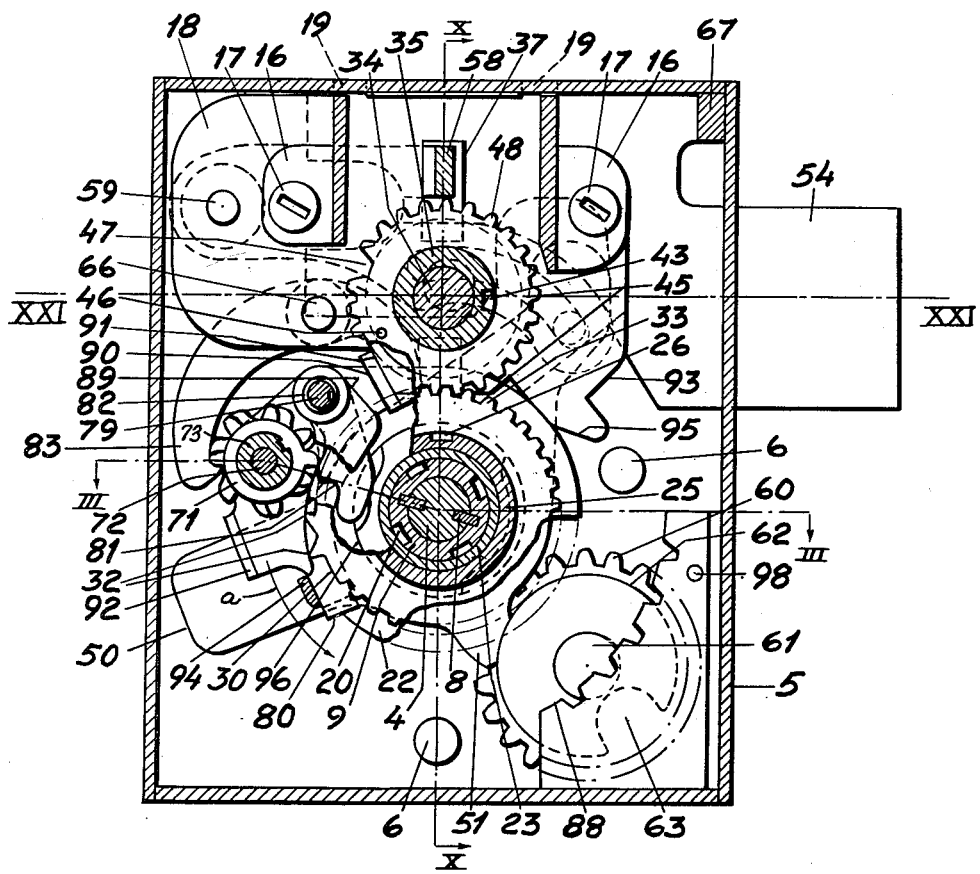

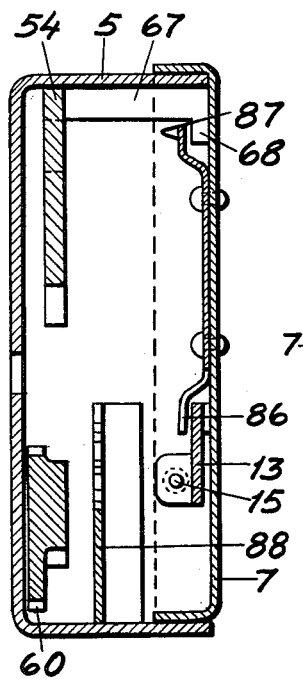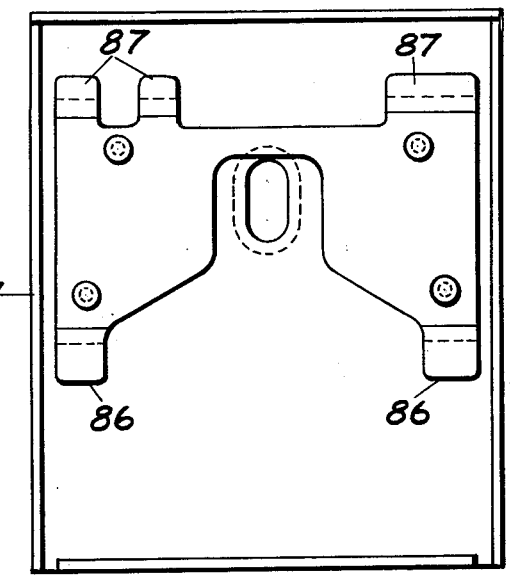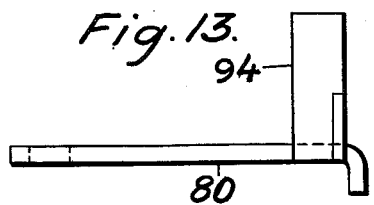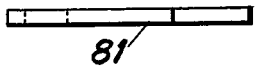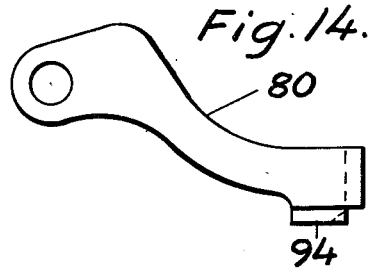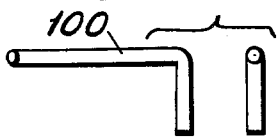

May 4, 1954 K. A. BERGENDAHL 2,677,265
COMBINATION TYPE CONTROL MECHANISM FOR LOCK BOLTS
Filed June 23, 1950 7 Sheets-Sheet 7
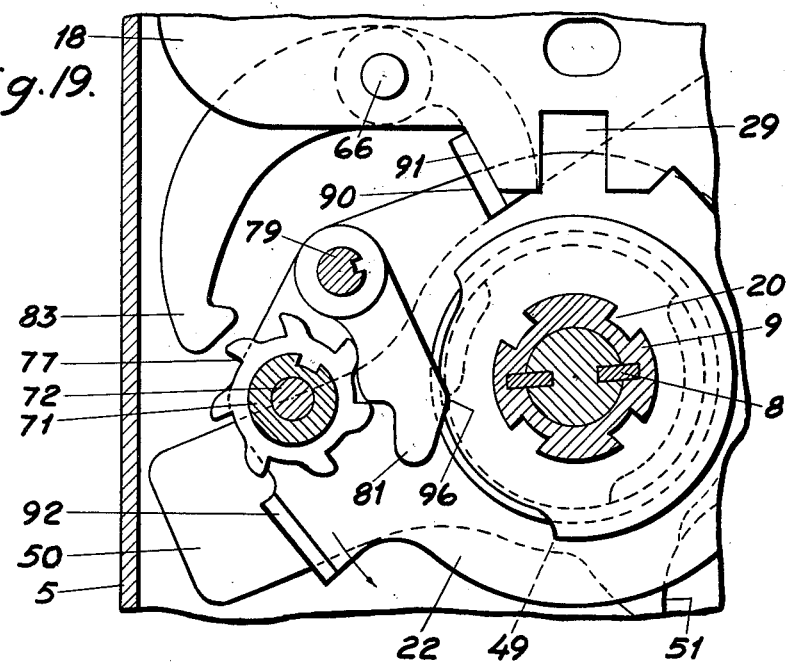
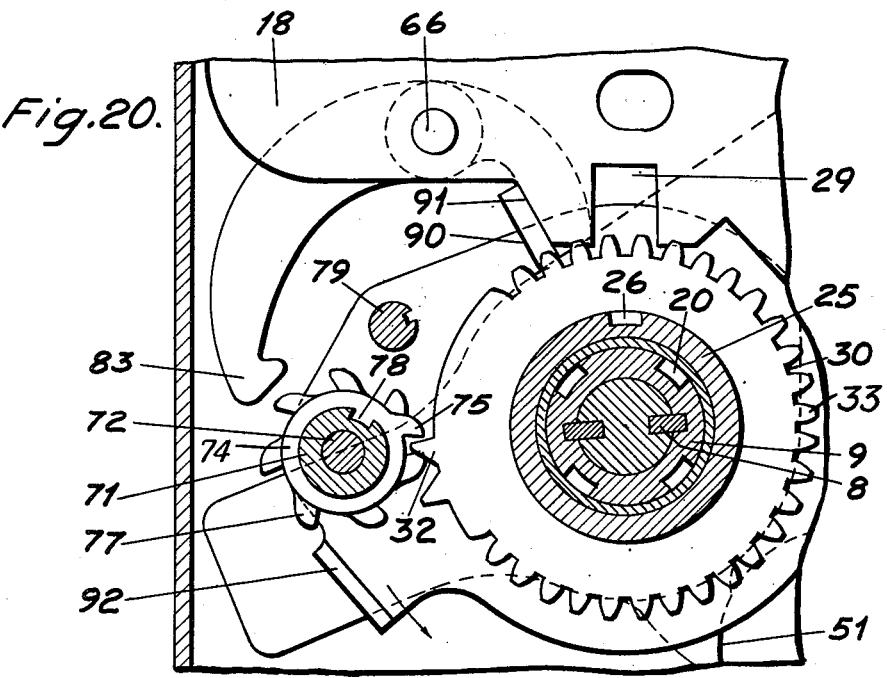

UNITED STATES PATENT OFFICE 2,677,265

COMBINATION TYPE CONTROL MECHANISM FOR LOCK BOLTS

Kavalli Alverius Bergendahl, Goteborg, Sweden, assignor to E. A. Rosengrens Kassaskapsfabriks Aktiebolag, Backavagen, Goteborg, Sweden Application June 23, 1950, Serial No. 169,843

Claims priority, application Sweden, June 30, 1949

12 Claims. (Cl. 70—305)

The present invention relates to a device in combination locks with tumblers for doors and the like, which tumblers are set for unlocking by means of a spindle extending through the door, namely by turning the spindle in both directions, said spindle being provided with or combined with a setting scale and an index on the outside of the door.

Numerous types of such locks are known, but all of them are rather troublesome to set for different combinations and require accurate setting and they are difficult to adjust again if any mistake is made during the setting.

The object of this invention is to simplify the construction in relation to the number of combinations possible and to so simplify the setting operation that there may be effected a quick unlocking by a very small number of movements which are easy to learn. The invention further provides for automatic engagement of tumblers, one independent of the other, by repeated rotation of the spindle, and permits a rapid restoration of the initial position if any mistake is made during the setting of the combination.

The invention is mainly characterized by the provision of such a mechanism in the lock, that for each rotation of the spindle from a fixed initial position a setter in the lock is automatically adjusted to bring a tumbler to unlocking position in a sequence predetermined by the combination, and a further feature is that the setting operation may be interrupted at any time and the setter restored to the initial position by special means, a resetter simultaneously being engaged, which returns the tumblers to the initial position where the resetter is automatically disengaged. The invention is furthermore characterized by a device for correcting a combination which is set up incorrectly.

The accompanying drawings shown an embodiment of a combination lock according to the invention.

Fig. 5 is an axial section of the setter. Figs. 6, 7 and 8 are sections along the lines VI—VI, VII—VII and VIII—VIII respectively, in Fig. 5, the underlying members being omitted.

Fig. 9 is a section along the line IX—IX in Fig. 10 showing the positions of the members at the commencement of a setting rotation. The direction of rotation is indicated by an arrow $a$.

Fig. 11 is a section along the line XI—XI in Fig. 2.

Fig. 12 shows the cover plate viewed from the inside.

Figs. 13 and 14 are two side views of the resetter and Figs. 15 and 16 are two side views of the setter catch. Fig. 17 shows a pin for correction of incorrectly set combination.

Figure 1:
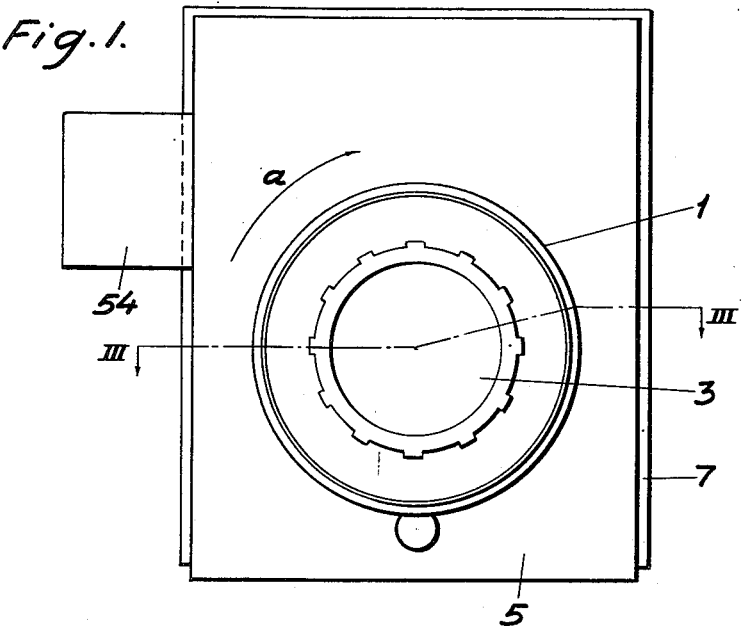
Fig. 1 shows the lock viewed from the outside of the door.

Fig. 18 shows the positions of some members during the setting operation. Figs. 19 and 20 show the members after the spindle has been turned some more. Fig. 21 shows on a smaller scale a section along the line XXI—XXI in Fig. 9.

In order to facilitate the reading of the drawings, reference is made in some places of the following text to certain figures, but the reference does not mean that the appointed figures are the only ones showing the members, the search for which in the drawings is intended to be facilitated by the said reference.

In common with other combination locks, the present lock comprises a setting dial 3, which is positioned on the outer side of the door when the lock is mounted in its place on the door, the dial shaft or spindle 4, which extends through the door, and the lock casing 5, which encloses the lock mechanism proper and is secured to the inner side of the door. The dial 3 is placed adjacent a preferably annular member 1 and is provided with a scale corresponding to an index 2 on the annular member. Inversely, the index may be fixed to the dial and the scale may be fixed to the member 1. The lock casing is secured to the door by screws extending through holes 6 in the rear wall thereof, the latter being closed at the inside of the door by a cover plate 7.

The spindle 4 is rigidly connected to a hub 9, as for instance by means of a key 8. Said hub 9 is provided with teeth 10 and is journalled on studs 11 and 12 which are provided on the lock casing 5 and an inner plate 13 respectively. The latter is positioned with respect to the lock casing by means of grooves in the lock casing engaged by the lugs 14 (Fig. 2) on the inner plate and is fixed in such position by screws at the points 15. At the upper portion the inner plate 13 is provided with outwardly bent lugs 16 which are secured by screws 17 to a tumbler bottom 18, which in turn is fixed to the casing by means of lugs 19 thereon entering holes in the wall of the lock casing 5. A number of axial key grooves 20 are provided in the hub 9. Drivers 21 and 22 constituting a carrier for the elements described below are provided with lugs fitting into the key grooves 20, and thus they are forced to rotate with the hub 9 (Figs. 3, 10) like spokes of a wheel. Mounted about the hub 9 between the two drivers is a spacing tube 23. These three members are screwed together to form a rigid unit by means of a nut 24.

Between the drivers and about the spacing tube 23 is the spacing washer sleeve 25, in which is provided a groove 26 receiving a lug of a spacing washer catch 27, the latter in turn being held by a lug 28 thereon entering the groove 29 in the tumbler bottom 18. Spacing washers 31 (Fig. 10) are provided on the spacing washer sleeve, each of them having a lug fitting into the groove 26 of the spacing washer sleeve 25. Consequently, these members will remain stationary with respect to the casing when the hub 9 is rotated.

Mounted about the spacing washer sleeve 25 and between the drivers 21, 22 are the tumbler pinions 30 and between those are washers 31. The tumbler pinions are relatively movable between the washers 31 and each of them is provided with a lug 32 at the periphery and with teeth 33 (Fig. 20).

Figure 3:
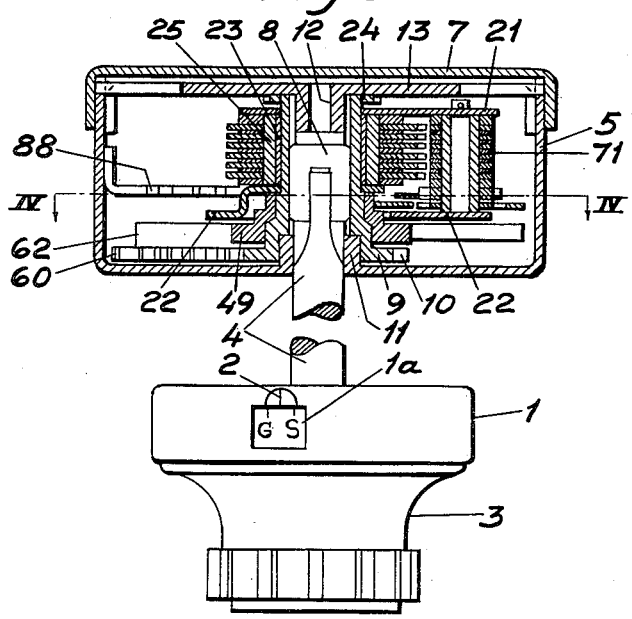
Fig. 3 is a section through the lock casing along the line III—III in Fig. 1 and a top view of the spindle and a dial with scale and index. A section taken along the line III—III in Fig. 9 would have the same appearance, excepting that it would be reversed so that parts located to the right in Fig. 9 would lie to the left in Fig. 3, and vice versa.
Figure 10:
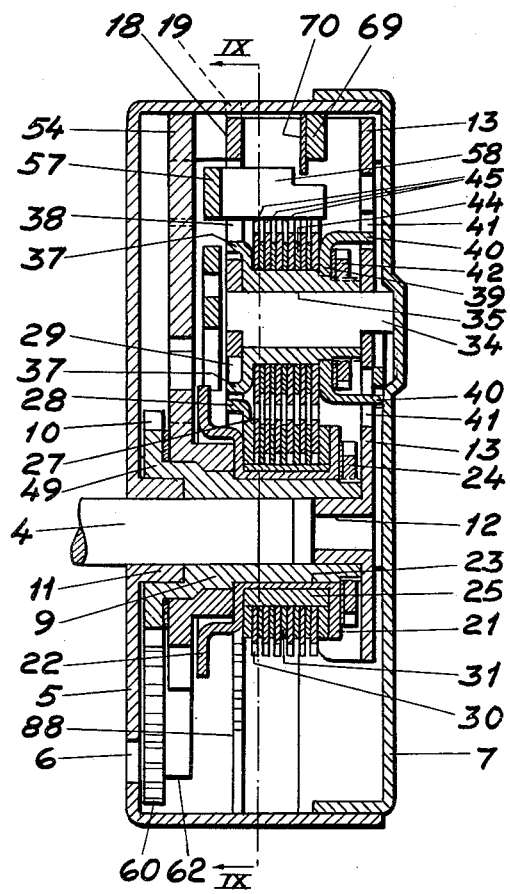
Fig. 10 is a section along the line X—X in Fig. 9

The set of tumblers is located between the tumbler bottom 18 and the inner plate 13 (Figs. 3, 9, 10). The set is mounted on a sleeve 35 which is in its turn mounted on the eccentric sheave 34 which is turnably mounted in the inner plate and the tumbler bottom, and the set may be moved towards and away from the tumbler pinions 30 by rotation of the eccentric sheave. The sleeve 35 is adjacent the door provided with a flange 36 having lugs 37 which engage with grooves 29 and 38 of the tumbler bottom 18 for guiding purposes. During its movement towards and away from the tumbler pinions the tumbler set is guided by a slide 39 which is guided in its turn by lugs 40 provided thereon and engaging with grooves 41 in the inner plate 13, and furthermore said slide is clamped against a shoulder on the tumbler sleeve 35 by a nut 42, a lug on said slide entering a groove 43 in the sleeve 35.

Mounted about the tumbler sleeve 35 and between the flange 36 and the slide 39 are the tumblers 45. They are separated by spacing washers 44, each of which engages with the groove 43 by means of a lug, and thus the spacing washers are not movable relatively to each other. The tumblers, on the other hand, are movable relatively to the spacing washers, and each of them is provided with a hole 46, a recess 47 and teeth 48.

Figure 4:
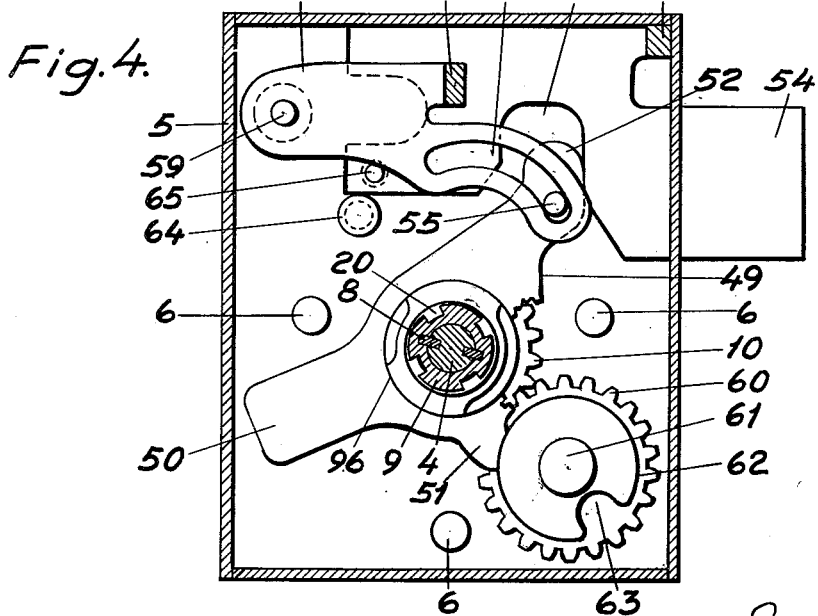
Fig. 4 is a section through the lock along the line IV—IV in Fig. 3 as viewed from the inside of the door and with the driver omitted.

The rollback 49 (Figs. 4, 9) is also mounted on the hub 9, and this in such a manner that it tends to follow the hub 9 by friction. Fig. 4 shows the rollback broken to make the teeth 10 visible. The rollback is equipped with or shaped so as to include a counter-weight 50, a lug 51 and a head 52. In Fig. 9 the tumbler pinions 30 and the driver 22 are broken in order that the lower portion of the rollback and the lug 51 shall appear. Also other members are shown broken in said figure in order that underlying members shall be visible. The said head 52 engages the recess 53 of the lock bolt, which is designated by 54. Attached to the head 52 is a pin 55, which movably enters a cam groove 56 in a rocker arm 57. The latter has an angularly bent portion or fence 58 extending axially over the tumblers 45. The rocker arm is mounted on a pin 59 which is fixed to the tumbler bottom 18. The groove 56 is so shaped in relation to the path of the rollback pin 55, that the rocker arm must sink down to allow a change of the position of the rollback.

The teeth 10 of the hub 9 engage a gear 60, which is mounted on a pivot 61 secured to the lock casing. The said gear has a cam surface 62 which glides along the lug 51 of the rollback 49, and the cam surface has a recess 63 receiving the lug 51 when all the tumblers are correctly set, i. e. when the recesses 47 are turned upwards, lying in one line paralleling the axis of rotation of the tumblers.

The bolt 54 (Fig. 4) is guided in a hole provided in the side of the lock casing and between a pin 64 and the upper end wall of the lock casing and furthermore by a pin 65 which is secured to the bolt and glides on the bottom of the lock casing and by a pin 66 located in the tumbler bottom 18, the opposite side of the bolt gliding on the last-mentioned pin. The bolt has an angularly bent portion 67 (Figs. 2, 4) with a hook 68 (Fig. 11). A bolt 69 (Figs. 2, 10) for the cover plate 7 is displaceably mounted in grooves located at the upper portion of the inner plate 13, said latter bolt having a hook equal to the hook 68 and being checked by a spring 70. A setter 71 is turnably mounted between the drivers 21, 22 on a pin 72 fixed to the driver. The setter comprises a hub sleeve 73 (Figs. 5–8), setting washers 74 each of which is provided with a lug 75, a gear 76 and a ratchet wheel 77, all driven by the hub sleeve by means of a lug provided on each of them and engaging a groove 78 in the hub sleeve. A pin 79 is supported by the drivers 21 and 22 and on said pin (Figs. 9, 19, 20) a resetter 80 and a setter catch 81 are mounted between them as well as above and beneath them are spacing washers guided in key grooves in the pin 79, the whole being pressed together by a helical spring 82.

Figure 2:
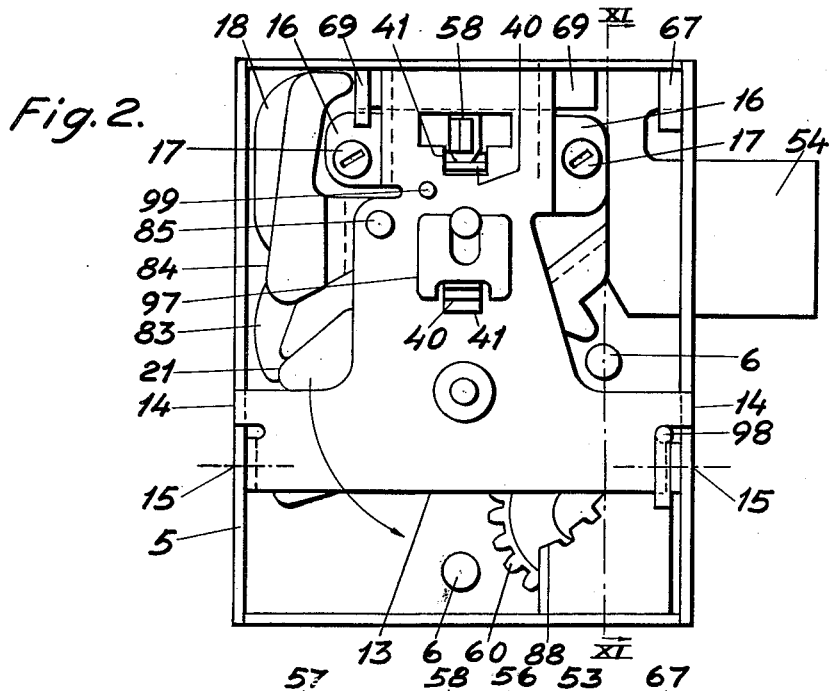
Fig. 2 shows the lock viewed from the inside of the door, the cover plate of the lock casing being omitted.

A feed hook 83 (Figs. 2, 9) is mounted on a pin 66 located in the tumbler bottom 18. A lever 84 locking the cover plate is mounted to a pin 85, which is riveted to the inner plate 13 (Fig. 2). On its inner side, the cover plate 7 is provided with hooks 87 intended to strike against the bolt portion 67 and against the bolt 69 for locking the cover plate. A toothed segment 88 is secured to one side wall of the lock casing in front of the toothed wheel 76 of the setter.

The lock functions as follows:

When the dial 3 is turned, the spindle 4, the hub 9, the drivers 21, 22 and accordingly also the setter 71, the resetter 80 and the setter catch 81 partake in the movement. The setting of the combination takes place within a sector which is limited in both directions. One limit of such sector is determined by the abutment of the portion 90 of the feed hook 83 against the abutment member 91, supported by the tumbler bottom, viz. when the dial is turned to the left, and the other limit is determined by the position to which the dial may be turned to the right from the first limit without the teeth of the gear 76 of the setter 71 coming into contact with the toothed segment 88, which is rigid with the lock casing 5.

To effect an unlocking, the dial 3 is first turned to the right as far as it will go, then to the left, and thereafter to the right to the first character. In this case the figure on the scale is turned to the right on the index, where it becomes visible through an opening 1a in the annular member 1. The dial 3 is then turned to the left again and then to the right until the next figure becomes located directly in front of the index. The dial is turned to the left once more and then to the right until the third figure reaches the index, and so on. When the last character of the combination has been moved in front of the index, the rotation to the left is repeated once again, and the next rotation to the right will unlock the lock.

In which direction the first and the last rotations take place depends on the construction and is not a feature of the invention. In detail, the following procedure takes place during the unlocking. Figs. 18, 19 and 20 show different stages of the setting operation.

When during the unlocking the dial 3 is first turned completely to the right, the drivers 21, 22 turn the setter 71 towards the toothed segment 88 and, no matter how the toothed wheel 76 of the setter is turned, its teeth will engage with the teeth of the toothed segment 88, the toothed wheels 74 thus being turned to their initial position, the angularly bent portion 94 of the resetter 80 is pressed towards the tumbler pinions 30 by the lug 95 of the tumbler bottom, and finally the upwardly bent flange 92 of the driver 22 strikes against the edge 93 of the tumbler bottom 18, whereby the turning to the right is stopped.

When the dial 3 is then turned to the left, the angularly bent portion 94 of the resetter seizes behind the lugs 32 of the tumbler pinions 30 and returns the said pinions and thus also the tumblers 45 to the initial position. When the dial 3 is turned to the left, it is stopped by the rear edge 89 of the resetter abutting against the angularly bent portion 90 of the feed hook 83, which in turn strikes against the abutment member 91 of the tumbler bottom 18. Then the resetter is released from engagement with the tumbler pinions and the feed hook is moved to engagement with the ratchet wheel 77. The upper driver 21 also strikes against the lever 84, which in turn pushes forth the cover plate bolt 69.

The dial 3 is turned to the right again, but this time only so far that the scale mark for the first figure of the combination will be situated directly in front of the index line 2. At this moment the feed hook 83 seizes behind one of the teeth of the ratchet wheel 77 and turns the setter in such a manner that the lug 75 of the first washer 74 strikes against the lug 32 of a tumbler pinion and turns the same, the latter in turn via the gear connection with one of the tumblers 45 rotating the same in such a manner that its recess 47 is brought to a position directly beneath the angularly bent portion 58 of the rocker arm 57. The part 96 of the now immovable rollback simultaneously brings the setter catch 81 into engagement with one of the peripherical lugs of the ratchet wheel 77. The other figures pertaining to the combination are set in the same manner, care being taken always to turn the dial 3 as far as it will go to the left for every setting rotation to the right.

Fig. 18 shows the position of the members when the setting has advanced so far that the setter 71 has been turned to a new position by engagement of one of the lugs of the ratchet wheel 77 with the feed hook 83, releasing the same, and that the setter catch 81 has been advanced somewhat by the part 96 of the rollback 49.

Fig. 19 shows how the setter catch has been pushed completely forwards and moved the setter somewhat backwards so that it is held in position by the setter catch lying between two lugs of the ratchet wheel 77. Fig. 20 shows the same stage as Fig. 19, but for the sake of clearness the setter catch has been omitted and a setter washer 74 is inserted in the drawing, it being visible that its lug 75 engages the lug 32 of one of the tumbler pinions 30, which is also inserted in the drawing, and carries the same along at continued rotation.

Upon execution of the number of setting operations integrating in the combination, which is the same as the number of tumblers contained in the lock, the dial is turned completely to the left. Now all the tumblers are so adjusted that the recesses 47 are located directly in front of the angular portion 58 of the rocker arm 57, so that the latter can sink down and release the rollback, which takes place when the recess 63 of the gear pinion 60 is directly in front of the lug 51 of the rollback 49. At the next turning to the right, the setter 71 is brought to such a position that the gap between the lugs 75 is directly in front of the tumbler pinions and the gap between two teeth of the toothed wheel 76 is diametrically opposed thereto. Thus, the setter moves clear of the lugs of the tumbler pinions as well as of the toothed segment. At continued rotation to the right so far that the scale is passed, also the gear pinion 60 has been turned so far that the recess 63 engages the lug 51 of the rollback 49 and turns the same, which in turn actuates the unlocking bolt, the portion 67 of which moves back the cover plate bolt 69, besides which the resetter is brought into engagement with the tumbler pinions as described above.

To effect a locking, the dial is turned completely to the left, at which the resetter drives the tumbler pinions and thus also the tumblers so that the position of the recess 47 is changed. When during continued rotations, without setting up the combination, the recesses 63 is brought directly in front of the lug 51, the latter is prevented from entering the recess because the portion 58 of the rocker arm rests against the peripheries of the tumblers and cannot descend any lower, whereby the rollback is prevented from moving by influence of the pin 55 and the groove walls 56.

During the whole process of setting up the combination, the portion 58 of the rocker arm 57 is clear of the tumblers 45, since the rocker arm is held in raised position by the pin 55 of the rollback 49, which in turn rests with the lug 51 against the cam surface 62 of the gear pinion 60.

Adjustment to new combination is effected by first unlocking the lock as described above, but at the last rotation after the combination is set, the dial is not turned completely to the right, but to a special, non-indicated mark. The bolts 69 and 54, the latter with its angularly bent portion 67, then are so adjusted, that they clear the hooks 87 of the cover plate 7, allowing the latter to be pushed upwards. Now the hooks 86 release the inner plate 13 and the cover plate 7 may be removed. Then the dial 3 is turned to the left until the last figure of the scale is in line with the index 2, the rocker arm 57 being raised and the angular portion 58 consequently going clear of the tumblers 45. A swingable knob 97 on the inner side of the lock is swung out and turned half a revolution to the right, the eccentric sheave 34 raising the tumblers 45 so that the recesses 47 engage with the angular portion 58 of the rocker arm, the tumblers simultaneously being released from the tumbler pinions 31 so as to allow a rotation of the latter independently of the tumblers.

The dial 3 is turned completely to the left, the resetter 80 moving the tumbler pinions to the initial position. The new combination is set up by the same process as that previously described for effecting an unlocking, namely with a number of turning movements corresponding to the number of tumblers contained in the lock, whereupon the knob 97 is turned half a revolution to the left to its previous position, at which moment the tumblers are brought into engagement with the tumbler pinions again, and then the dial is turned completely to the right.

The cover plate 7 cannot be mounted in its place until a control unlocking has been performed and the dial has been turned to the position described above for removal of the cover plate. If it appears impossible to mount the plate, this is due to one or more tumblers being improperly set by mistake, i. e. they have been set for a figure which is not included in the combination, for which reason the lock cannot be unlocked. If this happens, the dial is turned as far as it goes, first to be right and then to the left. A pin 100 resting in a hole 98 in the inner plate 13 and in the toothed segment 88 (Figs. 2, 9) is taken out and inserted into a hole 99 in the inner plate 13 and held there under light pressure axially. The dial is turned slowly to the right until the pin falls into the hole 46 of the first tumbler. Then the dial is turned all over to the left, and this process is repeated for all the tumblers. At this stage they are all positioned with the recesses 47 directly in front of the angular portion 58 of the rocker arm 57. The pin 100 is taken out and the knob 97 is turned half a revolution to the right, the dial is turned all over to the right, and now the setting up of the combination can be repeated.

If the combination is set up correctly, the members 67 and 69 will assume such a position at the control unlocking, that they go clear of the hooks 87 of the cover plate 7. The latter can be mounted when the dial has been turned to the mark described above, and now the lock can be locked.

The members of the lock which are included in the invention may be varied considerably within the scope of the invention.

Having now described my invention, what I claim as new and desire to secure by Letters Patent is:

1. A control mechanism for the bolt of a combination lock comprising a casing, a rotatable spindle extending into said casing, a setter carried by and rotatable with said spindle, an eccentric shaft parallel to said spindle and operable within said casing, an assembly of tumblers rotatably mounted on said shaft, each tumbler comprising a toothed wheel, an assembly of pinions rotatably mounted on said spindle and engaging corresponding toothed wheels of said tumbler assembly, means within said casing positioned to engage the setter and to rotate the same during only a relatively small portion of the movement thereof to a predetermined position in relation to the spindle when the setter is moved by rotation of the spindle in one direction through a predetermined setting angle and a setter catch positioned to engage the setter after the action of said means and to hold the setter in said predetermined position during the continued rotation of the spindle in said one direction through said predetermined angle and during the rotation thereof in the opposite direction, said setter successively engaging the pinions upon successive rotation of the spindle in the one direction for successively positioning the tumblers into their unlocked position.

2. A combination lock according to claim 1 in which the setter consists of a turnable cylinder provided with lugs spaced at different angles along the cylinder, one lug being positioned in the same plane as each pinion for turning the latter, the setter carrying a toothed gear which is coaxial with the cylinder, said lugs being spaced at double pitch within one sector of the periphery of said cylinder but at single pitch along the remaining part thereof, the teeth of said gear being spaced in the same manner, but the double pitch of the teeth being diametrically opposed to the double pitch of the lugs, the setter furthermore being provided with a ratchet wheel which is coaxial with the cylinder and adapted to cooperate with the setter catch for fixing the setter in relation to the spindle in acting position to the pinions, a rollback forming a part of the lock and a toothed segment positioned outside said setting angle, said rollback serving to operate said setter catch and said toothed gear cooperating with said toothed segment.

3. A combination lock according to claim 2 in which elements constituting a carrier for the setter and the setter catch are mounted and fixed upon the spindle, the setter being rotatably and the setter catch being swingably journalled in the carrier, the setter as well as the setter catch being moved at different angles with the spindle for setting the pinions to the positions corresponding to the positions to which the tumblers are to be rotated.

4. A combination lock according to claim 3 provided with a resetter which is journalled on the setter carrier for setting back the tumbler pinions from their set positions to their initial positions, said means being journalled in the lock casing and adapted to disengage the resetter from the tumbler pinions when the spindle is turned back to its initial position from a maximal turning in the opposite direction, said means simultaneously being moved to engagement with the ratchet wheel.

5. A combination lock according to claim 4, in which the carrier consists of two plate members which are fastened to the spindle in spaced relation to each other and located in parallel radial planes, the resetter, the setter catch and the setter being positioned between the plate members and the setter being parallel with the spindle and journalled in the plate members.

6. A device according to claim 1, comprising an inner plate positioned within the casing, holes in said inner plate and in said tumblers, and a lock pin adapted to be inserted into the said holes to hold them in alinement whereby recesses provided in the tumblers are positioned in front of an angular portion of a rocker arm.

7. A control mechanism for the bolt of a combination lock according to claim 1 in which the setter consists of a turnable cylinder provided with lugs spaced at different angles along the cylinder, one lug being positioned in the same plane as each pinion for turning the latter, the setter carrying a toothed gear which is coaxial with the cylinder, the combination further including a rollback within the casing, a toothed segment fixedly located in the casing and being positioned with respect to said toothed gear to cooperate therewith in response to maximal turning of said spindle in said one direction for shifting the setter to the starting position for the unlocked operation, said lugs being spaced at double pitch within one sector of the periphery of said cylinder but at single pitch along the remaining part thereof, the teeth of said toothed gear being spaced in the same manner, but the double pitch of the teeth being diametrically opposed to the double pitch of the lugs, the setter furthermore being provided with a ratchet wheel which is coaxial with the cylinder and positioned to cooperate with the setter catch for holding the setter in relation to the spindle in acting position to the pinions, the setter catch being operated mechanically by said rollback.

8. A control mechanism for the bolt of a combination lock according to claim 7 in which a carrier for the setter and the setter catch is mounted and fixed upon the spindle, the setter being rotatably and the setter catch being swingably journalled in said carrier, the setter being movable different angles with the spindle for setting the pinions to the positions corresponding to the positions to which the tumblers are to be rotated.

9. A control mechanism for the bolt of a combination lock according to claim 8 provided with a resetter which is journalled on the setter carrier for setting back the pinions from their unlocking positions to their initial positions, the setter rotating means being journalled in the casing and adapted to disengage the resetter from the pinions when the spindle is turned back to its initial position from the position of said maximal turning, said means simultaneously being moved to engagement with the ratchet wheel.

10. A control mechanism for the bolt of a combination lock according to claim 9 in which the carrier consists of two plate members which are fastened to the spindle in spaced relation to each other and located in parallel radial planes, the setter, the resetter and the setter catch being positioned between said plate members and the setter including a shaft journalled in the plates and extending parallel to the spindle.

11. A control mechanism for the bolt of a combination lock according to claim 1 including a lock pin, a rocker arm, a fence supported by said rocker arm and a plate within the casing, said plate having a hole therethrough, each tumbler also having a hole therethrough, and recesses therein, the hole in the plate and the hole in each tumbler being adapted to be aligned for reception of said lock pin, such alignment occurring when the tumblers are in the unlocking position so that said recesses are brought to a position in front of said fence.

12. A device according to claim 1 in which the setter carries a toothed gear and in which a member, substantially consisting of a toothed segment, is positioned outside of said setting angle and arranged to turn the setter to the initial position by engagement with said toothed gear.

References Cited in the file of this patent

UNITED STATES PATENTS

| Number | Name | Date |
|---|---|---|
| 513,764 | Cooper | Jan. 30, 1894 |
| 2,104,516 | Hage | Jan. 4, 1938 |
| 2,125,607 | Fuchs | Aug. 2, 1938 |
| 2,289,234 | Berggren | July 7, 1942 |

FOREIGN PATENTS

| Number | Country | Date |
|---|---|---|
| 603,281 | Germany | Oct. 1, 1934 |